Sept. 3, 1940.  A. N. HANSON ET AL  2,213,700
TESTING FIXTURE
Filed March 9, 1939   2 Sheets-Sheet 1
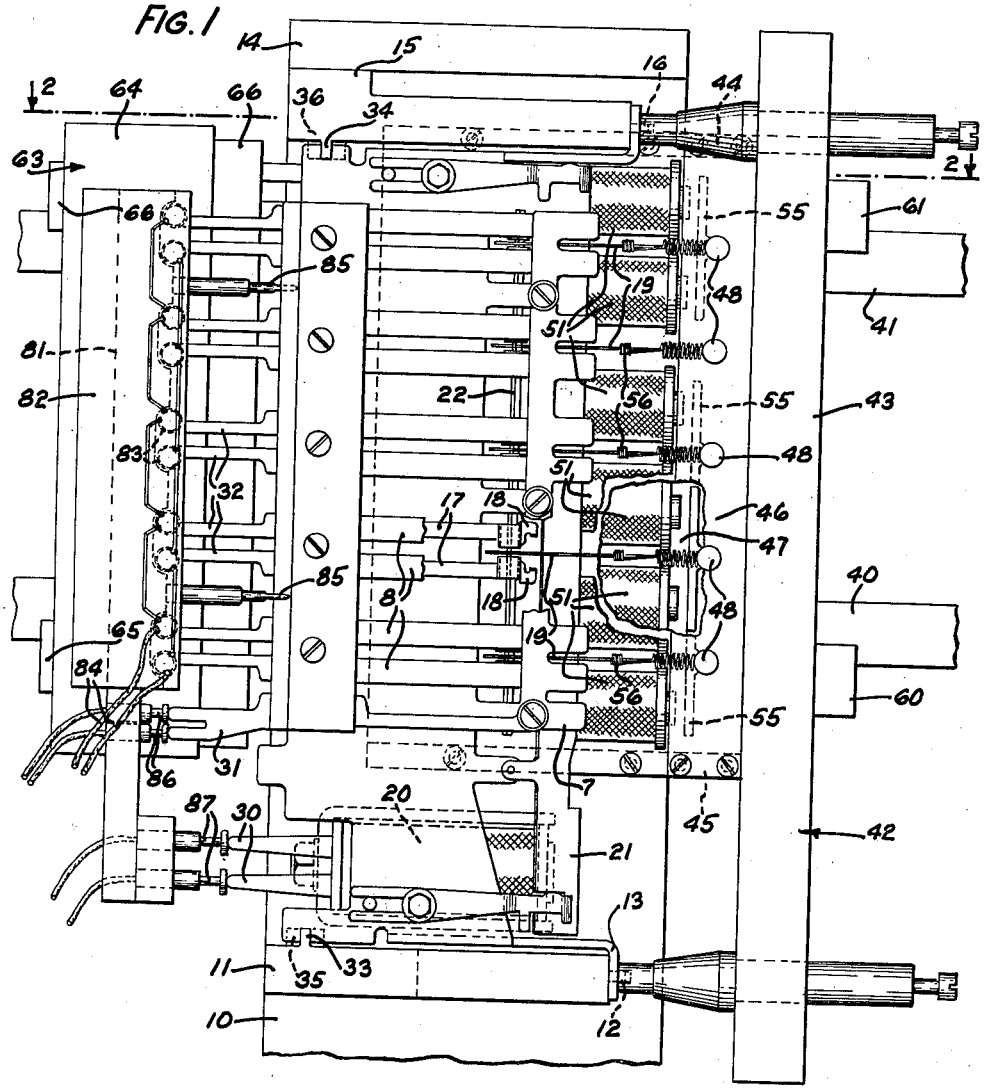
INVENTORS
A. N. HANSON
S. F. WARNER
BY Emery Robinson
ATTORNEY Sept. 3, 1940.  A. N. HANSON ET AL  2,213,700
TESTING FIXTURE
Filed March 9, 1939  2 Sheets-Sheet 2
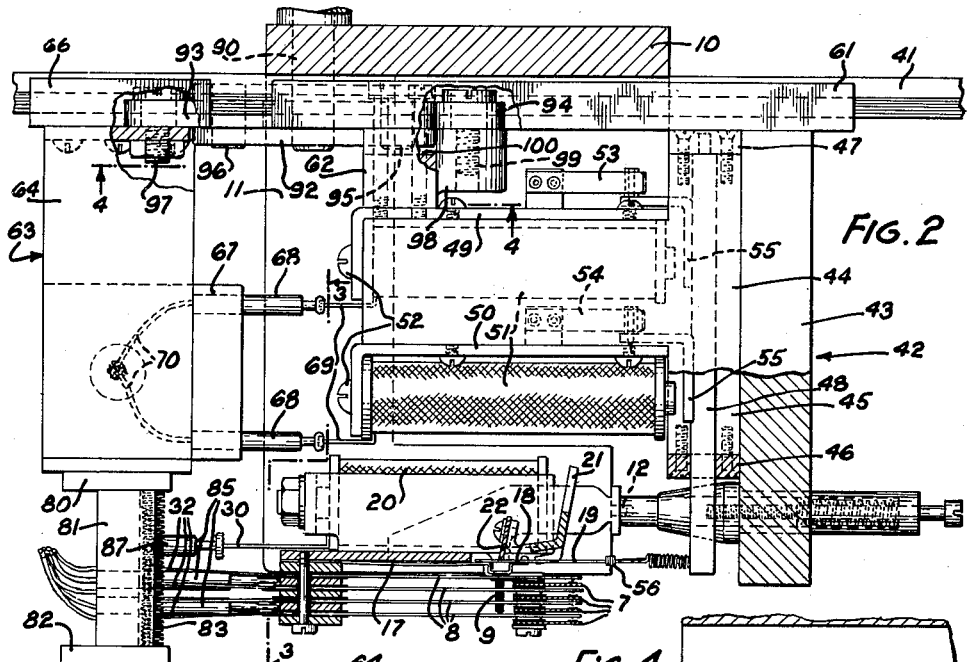
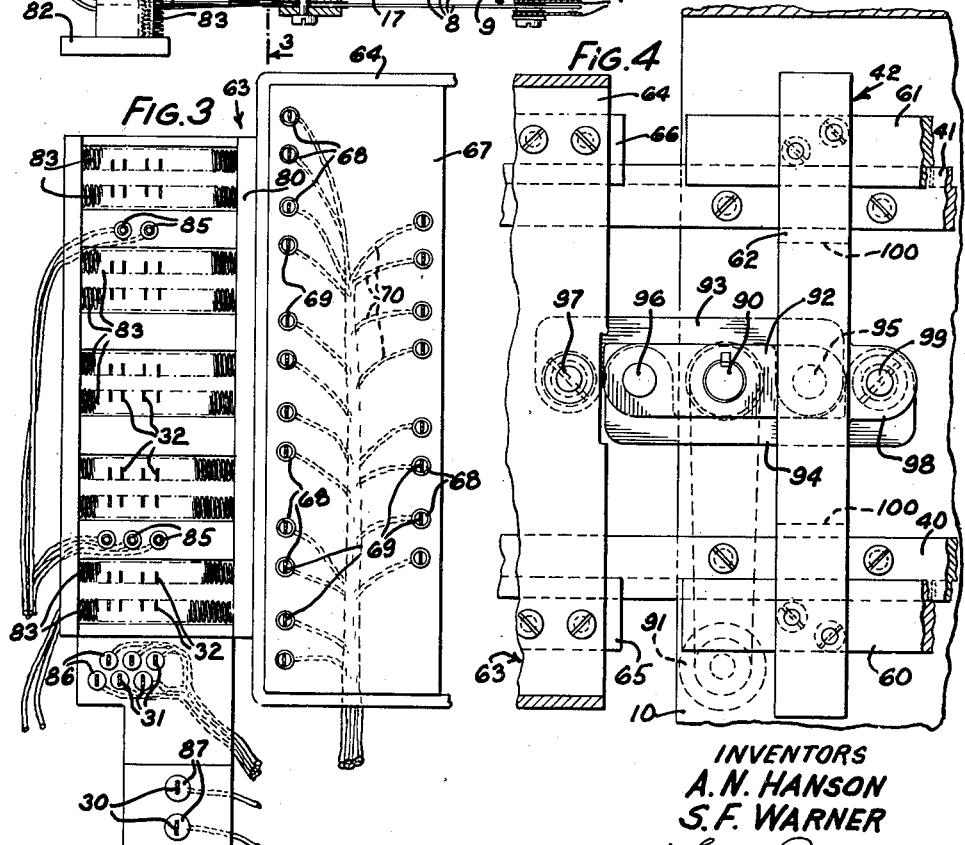
INVENTORS
A. N. HANSON
S. F. WARNER
BY Emery Robinson
ATTORNEY Patented Sept. 3, 1940

2,213,700

UNITED STATES PATENT OFFICE 2,213,700

TESTING FIXTURE

Arvid N. Hanson, Hinsdale, and Stanley F. Warner, Forest Park, Ill., assignors to Western Electric Company, Incorporated, New York, N. Y., a corporation of New York Application March 9, 1939, Serial No. 260,678

12 Claims. (Cl. 179—175)

This invention relates to a testing fixture and more particularly to a testing fixture for telephone apparatus.

It is an object of the present invention to provide a simple and effective testing fixture for electrical apparatus.

In accordance with one embodiment of the invention, a fixture is provided for holding a telephone switching unit, known in the telephone art as a crossbar switch vertical unit, during operation and breakdown tests thereon. The fixture includes a supporting mechanism which simulates the frame in which the unit will be mounted when in use, and which comprises a stationary support having pins thereon adapted to enter mounting holes in the unit, and spring pressed members cooperating with the pins are mounted on a frame which is slidable to move the spring pressed members into engagement with a unit mounted on the pins. A second movable frame member is provided which carries contacting members, in the form of spring pressed plungers and coiled springs, for engaging the terminals of the unit under test and terminals of switching devices mounted on the first mentioned frame. The two slidable frames are connected by links to opposite ends of an actuating bar operable by a hand crank whereby, after a vertical unit has been placed on the supporting pins, a single turn of the hand crank through 180° will cause the vertical unit to be firmly clamped in position and will connect all of the terminals of the unit to various leads of a cable extending to testing circuits and will simultaneously connect the switching devices to other testing circuits.

A better understanding of the invention will be had by reference to the following detailed description of the apparatus when considered in conjunction with the accompanying drawings, wherein Fig. 1 is a front elevational view of a testing fixture embodying the present invention;

Fig. 2 is an irregular sectional view taken substantially along the line 2—2 of Fig. 1 in the direction of the arrows, parts being broken away to more clearly illustrate the structural features of the invention;

Fig. 3 is a fragmentary vertical sectional view, taken on the line 3—3 of Fig. 2 in the direction of the arrows, showing, in elevation, the plungers and springs for connecting the unit under test and the various parts of the testing device to their associated testing circuits, and Fig. 4 is a fragmentary sectional view taken substantially along the line 4—4 of Fig. 2 in the direction of the arrows and shows the actuating mechanism for the movable frames.

Referring to the drawings, wherein like reference characters designate the same parts throughout the several views, a vertically extending main support 10 is provided, upon which the various parts of the apparatus are mounted. The frame member 10 has suitably fixed thereto an L-shaped supporting arm 11 adjacent its lower end, on which there is provided a mounting pin or stud 12, adapted to enter into a mounting hole in the supporting frame 13 of a crossbar switch vertical unit. A plate 14 is fixed to the top of the main support 10 and has attached to its free end an L-shaped member 15 15, carrying a pin or stud 16 corresponding to the pin or stud 12, and adapted to enter into a mounting hole at the other end of the vertical unit supporting frame 13. The left ends (Fig. 1) of the L-shaped supporting arm 11 and the L-shaped member 15 are provided with extending projections 33 and 34, which cooperate with projections 35 and 36, respectively, to position the left end of the frame 13 on the L-shaped supporting arm 11 and the member 15.

The crossbar switch vertical unit, which includes the supporting frame 13, is a switching unit well known in the telephone art, which comprises a plurality of strips of interconnected contacts 7—7 in operative association with individually insulated movable contacts 8—8. There are provided ten groups of four each of contacts 8 and each group of four contacts 8 have a common actuating insulator 9 (Fig. 2), which is mounted on an actuator spring 17, having a shoulder 18 formed thereon, against which a selecting finger 19 may be moved whereby, upon energization of a selecting electromagnet 20, the armature 21 of the electromagnet will move a bar 22 into engagement with the selecting finger 19 and will actuate any group of contacts 8 that have a selecting finger 19 interposed between the shoulder 18 of the spring 17 and the bar 22. The electromagnet 20 is provided with a pair of terminals 30—30, each group of contacts 7—7 is provided with a terminal 31, and the contact springs 8—8 are provided with terminals 32—32.

Fixed to the main support 10 are a pair of track members 40 and 41, which extend outwardly to the right and left (Fig. 1) from the main support 10. These track members are adapted to slidably support two movable frames, designated generally by the numerals 42 and 63. The frame 42 comprises a vertically extending plate 43, having fixed thereto, adjacent its upper and lower ends, a pair of T-shaped horizontally extending plates 44 and 45, to which there are fixed a pair of vertically extending bearing plates 46 and 47 in which a series of armature shafts 48—48 are rotatably mounted. Fixed to opposite sides of the main portion of the T-shaped plates 44 and 45 are a pair of L-shaped magnet supports 49 and 50, which have six and four magnet coils 51—51, respectively, mounted thereon by means of screws 52—52. The magnet supports 49 and 50 also support armature centering springs 53 and 54, respectively. There are five of these armature centering springs 53 and 54 mounted on the L-shaped plates, of which three are mounted on plate 49 and two are mounted on plate 50 for centering armatures 55 fixed to the armature shafts 48. Each of the armature shafts 48 has one of the selecting fingers 19 mounted thereon, which is surrounded by a damping spring 56.

The plate 43 is fixed to a pair of guide members 60 and 61, which slide upon the track members 40 and 41, respectively, and at their left ends (Fig. 2) the guide members 40 and 41 have fixed to them a vertically extending bar 62, which is attached to the L-shaped magnet support 49. It will thus be apparent that the plate 43 and vertically extending bar 62 support the magnets and their associated armatures on the guide members 60 and 61, whereby the whole frame 42 may be moved as a unit on the track members 40 and 41.

Adjacent their left ends (Fig. 1), the track members 40 and 41 have slidably mounted thereon the second frame 63, which comprises a rectangular mounting bracket 64 fixed to a pair of guide members 65 and 66, which are slidable upon the track members 40 and 41, respectively. The mounting bracket 64 has mounted within it a plate 67 of insulating material, on which there are mounted a plurality of plunger type contactors 68, adapted to engage terminals 69 of the electromagnets 51 when the frames 42 and 63 are moved toward each other, thereby to connect the electromagnets in the frame 42 with associated lead-out wires 70 connected to testing circuits, not shown. Mounted on an outer surface of the bracket 64 is a flat plate 80 of insulating material, to which there is suitably secured, at right angles to the widest face thereof, a second plate 81 of insulating material on which, in turn, there is mounted a plate 82, similar to the plate 80. The three plates 80, 81 and 82, which are joined together, form a contact supporting element I-shaped in cross section. Extending between the plates 80 and 82, in the portion thereof not engaged by the plate 81, are a series of coiled springs 83, which are adapted to engage the terminals 32 of the movable contact springs of the vertical unit, the terminals 32 engaging between adjacent convolutions of the coiled springs 83. In this manner, all of the terminals 32 of each pile of movable contact springs will be connected one to another and to wires 84 in conductive relation with the springs 83.

The plate 81 has mounted thereon a plurality of spring pressed plungers 85 having, as shown in Figs. 1 and 2, sharp points thereon for engaging the metallic separator plates of the vertical units. There are also mounted, on the plate 81, a set of spring pressed plunger type contactors 86 for connecting the terminals 31 to the testing circuits, not shown, and a pair of spring pressed plungers 87 for connecting the terminals 30 of the electromagnet 20 to the testing circuits, not shown.

The main support 10 has a shaft 90 journalled therein, to which there is keyed a crank handle 91, whereby the shaft 90 may be turned to rotate a crank member 92 having a pair of links 93 and 94 pivoted thereto at 95 and 96, respectively. The opposite ends of the links 93 and 94 are pivotally connected to the bracket 64 at 97 and to a projection 98 on the bar 62 at 99, respectively. The bar 62 has a portion thereof cut away, as shown at 100, to permit free rotation of the crank member 92. As clearly shown in Fig. 4, the crank has been rotated in a clockwise direction as far as it will go to bring the frame 42 and the frame 63 together, thereby clamping the vertical unit in the fixture and moving the various contactors into engagement with their associated parts. In the position shown in the various figures, a vertical unit is in position in the fixture, and after the unit has been tested, the rotation of the crank handle 91 in a counterclockwise direction through 180° will move the frames 42 and 63 apart and permit the removal of the vertical unit from the fixture and the fixture will then be ready to have another unit placed in it. A vertical unit placed in the fixture described hereinbefore will have the terminals of its electromagnet 20 connected through the contactors 87 to any suitable circuit whereby the electromagnet may be operated and the electromagnets 51 will also be connected through the wires 84 to suitable testing circuits, which may operate the electromagnets in any desired sequence to shift the selecting fingers 19 into association with either of the contact springs with which they are associated, whereby any desired combination of contacts may be tested for their operation and the insulation between the various parts of the device may be tested by applying one side of a breakdown circuit to the plungers 85 which engage the separators of the vertical unit and connecting the other side of said circuit to any other metallic parts of the unit.

Although a specific embodiment of the invention has been described hereinbefore, it will be understood that many modifications may be made of the device without departing from the invention, which is to be limited only by the scope of the appended claims.

What is claimed is:

1. In a testing fixture, a pair of relatively slidable frames, means on one of said frames for clamping a switch to be tested in the fixture, means on the other frame for making electrical contact with the switch being tested at a plurality of points, and means for imparting relative movement to said frames.

2. In a testing fixture for switching mechanisms, a track, a pair of frames mounted on said track, clamping members mounted on one of said frames for clamping the switch to the fixture upon movement of the frame in one direction, means mounted on the other frame for making electrical contacts with separated parts of the switch being tested, and means for moving said frames toward each other.

3. In a testing fixture for switching mechanisms, a track, a pair of frames mounted on said track, clamping members mounted on one of said frames for clamping the switch to the fixture upon movement of the frame in one direction, means mounted on the other frame for making electrical contacts with separated parts of the switch being tested, and means for moving said frames toward each other, said contacting means including a series of coiled springs for engaging parts of the switch between the convolutions thereof.

4. In a testing fixture for electrical testing apparatus having a plurality of terminals extending therefrom, means for supporting the apparatus to be tested in a predetermined position, and means for making contact with the terminals on the apparatus including a plurality of coiled springs for engaging the terminals between convolutions thereof.

5. In a testing fixture for electrical apparatus having a series of terminals extending therefrom, means for supporting the fixture in a predetermined position, and means for engaging the terminals including a series of coiled springs for receiving said terminals between the convolutions thereof to make a resilient contact therewith, and means for moving the coiled springs into engagement with the terminals.

6. In a contact fixture for electrical apparatus having a plurality of extending terminals, means for supporting the apparatus to be tested in a predetermined position, clamping means for holding the apparatus in said position, a frame for supporting said clamping means, a series of contacting devices for engaging parts of said apparatus and said terminals, a frame for supporting said contact making means, and a common means for moving the two frames toward each other.

7. In a contact fixture for electrical apparatus having a plurality of extending terminals, means for supporting the apparatus to be tested in a predetermined position, clamping means for holding the apparatus in said position, a frame for supporting said clamping means, a series of contacting devices for engaging parts of said apparatus and said terminals, a frame for supporting said contact making means, and a common means for moving the two frames toward each other, said last mentioned means including a crank arm and a pair of links interconnecting opposite ends of the crank arm and the frames.

8. A testing fixture for telephone switching units comprising a contact supporting frame, a plurality of contacting devices carried by said contact supporting frame, a clamping frame, means for moving said frames toward each other to engage a unit to be tested, a plurality of selecting magnets mounted on one of said frames, and a plurality of selecting fingers associated with said magnets for simulating apparatus associated with the apparatus under test.

9. A testing fixture for telephone switching units comprising a contact supporting frame, a plurality of contacting devices carried by said contact supporting frame, a clamping frame, a track for slidably supporting said frames, means for moving said frames toward each other along the track to engage a unit to be tested, a plurality of selecting magnets mounted on one of said frames, and a plurality of selecting fingers associated with said magnets for simulating apparatus associated with the apparatus under test.

10. A testing fixture for telephone switching units comprising a contact supporting frame, a plurality of contacting devices carried by said contact supporting frame, a clamping frame, a track for slidably supporting said frames, crank actuated means common to the frames for moving said frames toward each other along the track to engage a unit to be tested, a plurality of selecting magnets mounted on one of said frames, and a plurality of selecting fingers associated with said magnets for simulating apparatus associated with the apparatus under test.

11. A testing fixture for telephone switching units comprising a contact supporting frame, a plurality of contacting devices carried by said contact supporting frame, a clamping frame, means for moving said frames toward each other to engage a unit to be tested, a plurality of selecting magnets mounted on one of said frames, and a plurality of selecting fingers associated with said magnets for simulating apparatus associated with the apparatus under test, said contacting devices being positioned to contact parts of the switching unit and parts of the magnets upon movement of the frames toward each other.

12. In a testing fixture for switching mechanisms, a track, a pair of frames mounted on said track, clamping members mounted on one of said frames for clamping the switch to the fixture upon movement of the frame in one direction, means mounted on the other frame for making electrical contacts with separated parts of the switch being tested, and means for moving said frames toward each other to clamp the switch to the fixture and make said contacts therewith.

ARVID N. HANSON.
STANLEY F. WARNER.